United States Patent
Cuschieri et al.

(10) Patent No.: US 8,270,255 B2
(45) Date of Patent: Sep. 18, 2012

(54) SYSTEM FOR MEASURING ACOUSTIC SIGNATURE OF AN OBJECT IN WATER

(75) Inventors: Joseph M. Cuschieri, Boca Raton, FL (US); Jason J. Orlando, West Palm Beach, FL (US); Michael D. Wilt, Boca Raton, FL (US); Brian S. Tilton, Jupiter, FL (US); Scott K. Wrieden, Jupiter, FL (US); Alex D. Fiebel, Tequesta, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 328 days.

(21) Appl. No.: 12/130,479

(22) Filed: May 30, 2008

(65) Prior Publication Data

US 2009/0296527 A1 Dec. 3, 2009

(51) Int. Cl.
*G01V 1/38* (2006.01)

(52) U.S. Cl. .......................................... 367/154; 367/13
(58) Field of Classification Search .................. 367/13, 367/20, 153, 154
See application file for complete search history.

(56) References Cited

U.S. PATENT DOCUMENTS

| | | | |
|---|---|---|---|
| 3,187,831 A | 6/1965 | Smith | |
| 3,354,984 A * | 11/1967 | Pavey, Jr. ....................... | 367/154 |
| 3,406,778 A | 10/1968 | Barry | |
| 3,673,556 A * | 6/1972 | Biggs ............................. | 367/18 |
| 4,160,229 A * | 7/1979 | McGough .................... | 367/154 |
| 4,229,809 A | 10/1980 | Schwalbe | |
| 4,635,236 A | 1/1987 | Roberts | |
| 4,644,507 A | 2/1987 | Ziolkowski | |
| 4,648,080 A | 3/1987 | Hargreaves | |
| 4,716,553 A | 12/1987 | Dragsund et al. | |
| 4,719,987 A | 1/1988 | George, Jr. et al. | |
| 4,903,246 A | 2/1990 | Jarman | |
| 4,908,801 A | 3/1990 | Bell et al. | |
| 5,047,990 A | 9/1991 | Gafos et al. | |
| 5,119,341 A | 6/1992 | Youngberg | |
| 5,231,609 A | 7/1993 | Gaer | |
| 5,452,262 A | 9/1995 | Hagerty | |
| 5,521,885 A * | 5/1996 | Harvey ......................... | 367/154 |
| 5,627,798 A | 5/1997 | Siems et al. | |
| 5,691,957 A | 11/1997 | Spiesberger | |
| 5,930,199 A * | 7/1999 | Wilk ............................... | 367/88 |
| 6,208,584 B1 * | 3/2001 | Skinner .......................... | 367/13 |
| 6,668,218 B1 | 12/2003 | Bulow et al. | |
| 6,691,038 B2 * | 2/2004 | Zajac ............................. | 367/20 |
| 6,788,618 B2 | 9/2004 | Clayton et al. | |
| 7,042,803 B2 | 5/2006 | Kutty et al. | |
| 2003/0202423 A1 | 10/2003 | Clayton et al. | |
| 2006/0056273 A1 | 3/2006 | Scoca et al. | |

* cited by examiner

*Primary Examiner* — Ian Lobo

(74) *Attorney, Agent, or Firm* — Howard IP Law Group, P.C.

(57) ABSTRACT

A system for measuring acoustic signature of a target object in water includes a plurality of rigid segments connected to each other to form a longitudinal member and a plurality of floats connected to the longitudinal member. Two buoys are connected at two ends of the longitudinal member and two weights are suspended from the buoys, thus making the longitudinal member neutrally buoyant when suspended in water. A plurality of hydrophones and an acoustic projector of a known source level are connected to the longitudinal member. The system further includes a data acquisition system for receiving signals from hydrophones and a signal processing means for processing signals received by data acquisition and determining acoustic signature of the target object. A depth/pressure sensor may be included. A pinger is located on the target object to measure range of target object to hydrophones. Range to target object is displayed in real time.

22 Claims, 7 Drawing Sheets

SYSTEM FOR MEASURING ACOUSTIC SIGNATURE OF AN OBJECT IN WATER

STATEMENT REGARDING FEDERALLY SPONSORED RESEARCH OR DEVELOPMENT

This invention was made with U.S. Government support under Contract Number N00024-02-C-6309 awarded by the U.S. Navy and the U.S. Government may have certain rights in the invention.

FIELD OF THE INVENTION

The present invention relates generally to a system and method for measuring acoustic signals from objects disposed in a body of water.

BACKGROUND OF THE INVENTION

Detection and measurement of acoustic signature and radiated noise signals are important factors in the design and development of marine systems, for example, platforms. As understood by those of ordinary skill in the art, an acoustic signature represents a unique acoustic pattern that is produced by a structure typically when externally excited, and may take the form of amplitude and frequency of signal, for example. Acoustic signatures have been used to detect and monitor surface and semi-submerged and fully submerged submersible vehicles, such as remote mine hunting vehicles or RMVs.

Various systems have been developed to measure the acoustic signature of an object in water. Systems that have been used for measuring the acoustic signature of such objects are generally permanently installed in specific geographic locations. Such permanently installed systems are cost prohibitive to use and cause significant logistical and financial impediments in the implementation of routine testing, measurement and calibration checks during integration phases of platform design and construction. Moreover, deploying such systems is both time and skill intensive. Such systems tend to therefore be used only for final qualifications of the marine platforms. Some portable systems are available, however, they have not been found to be very reliable and further, such portable systems often lack real time feedback on the measured acoustic signature as well as range to the platforms. Alternative mechanisms are desired.

SUMMARY OF THE INVENTION

In an embodiment of the invention, a system for measuring acoustic signature of a target object in water includes a plurality of pipe segments detachably connected to each other to form a longitudinal member. In one embodiment, first and second buoys are connected to the longitudinal member and first and second weights are suspended from the first and second buoys. A plurality of floats connected to the longitudinal member, in conjunction with the first and second buoys and the first and second weights, renders the longitudinal member neutrally buoyant when suspended in water. A plurality of hydrophones is connected to the longitudinal member at a predetermined distance from one another. An acoustic projector of a known source level and in one embodiment, a pressure/depth sensor is also included in the system. The system also includes a means for receiving electronic signals from the hydrophones in real time and a signal processing means for processing the received signals to determine the acoustic signature amplitude and frequency of the target object.

An embodiment of the invention includes a kit for measuring acoustic signature of a target object in water. Such a kit includes a plurality of pipe segments and a plurality of inserts. The plurality of inserts are adapted to detachably connect at least two of the plurality of pipe segments with each other while allowing the two connected pipe segments to bend at the joint relative to each other. The kit further includes a plurality of hydrophones which are adapted to be connected to the plurality of pipe segments and a plurality of floats which are also adapted to be connected to the plurality of pipe segments. The kit includes an acoustic projector which is configured to calibrate the plurality of hydrophones and a depth/pressure sensor. The kit further includes a line which may be strung through the plurality of pipe segments, keeping them together in case an insert fails to keep any two of the pipe segments connected. A plurality of cables is also included which are adapted to connect to the plurality of hydrophones and to communicate with a data acquisition system. The kit also includes at least two buoys and two weights which may be attached to the plurality of pipe segments. The two buoys and the two weights, in conjunction with the plurality of floats, render the plurality of pipe segments neutrally buoyant when the assembled kit is suspended in water.

Another embodiment of the invention includes a method for measuring acoustic signature of a target object in water. The method includes the steps of passing a line through a first rigid end segment and attaching a buoy and a weight to the first rigid end segment. The method further includes the step of attaching a first float and a first hydrophone to the first rigid end segment. The method then includes the steps of stringing a second rigid segment over the line and detachably connecting the second rigid segment to the first rigid end segment. A second float and a second hydrophone are attached to the second rigid segment. A plurality of intermediate rigid segments are strung over the line and each of the plurality of rigid segments is detachably connected to each other sequentially and ultimately to the second rigid segment. The method also includes the steps of attaching a float and a hydrophone to each of the plurality of intermediate rigid segments. An acoustic projector is attached to an intermediate rigid segment. A second rigid end segment is strung over the line and is detachably connected to the last of the plurality of intermediate rigid segments. The method further includes a step of attaching a second buoy and a second weight to the second rigid end segment. The hydrophones are electrically coupled to a data acquisition system and the rigid segments are suspended in water at a predetermined depth. The method also includes a step of processing signals received by the hydrophones to determine acoustic signature of the target object in water. The processing step includes correlating GPS signal data with the received hydrophone signal data received from the target object.

Yet another embodiment of the invention includes a neutrally buoyant hydrophone array apparatus. The apparatus includes a plurality of rigid segments detachably connected to each other to from a neutrally buoyant longitudinal member. A plurality of hydrophones is coupled to the longitudinal member and is electrically coupled to a data acquisition system. An acoustic projector is coupled to the longitudinal member. The projector is configured to emit acoustic signals to calibrate the plurality of hydrophones.

BRIEF DESCRIPTION OF THE FIGURES

Understanding of the present invention will be facilitated by consideration of the following detailed description of the exemplary embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical submerged systems. However, because such elements are well known in the art, and because they do not facilitate a better understanding of the present invention, a discussion of such elements is not provided herein. The disclosure herein is directed to all such variations and modifications known to those skilled in the art.

Figure 1A:
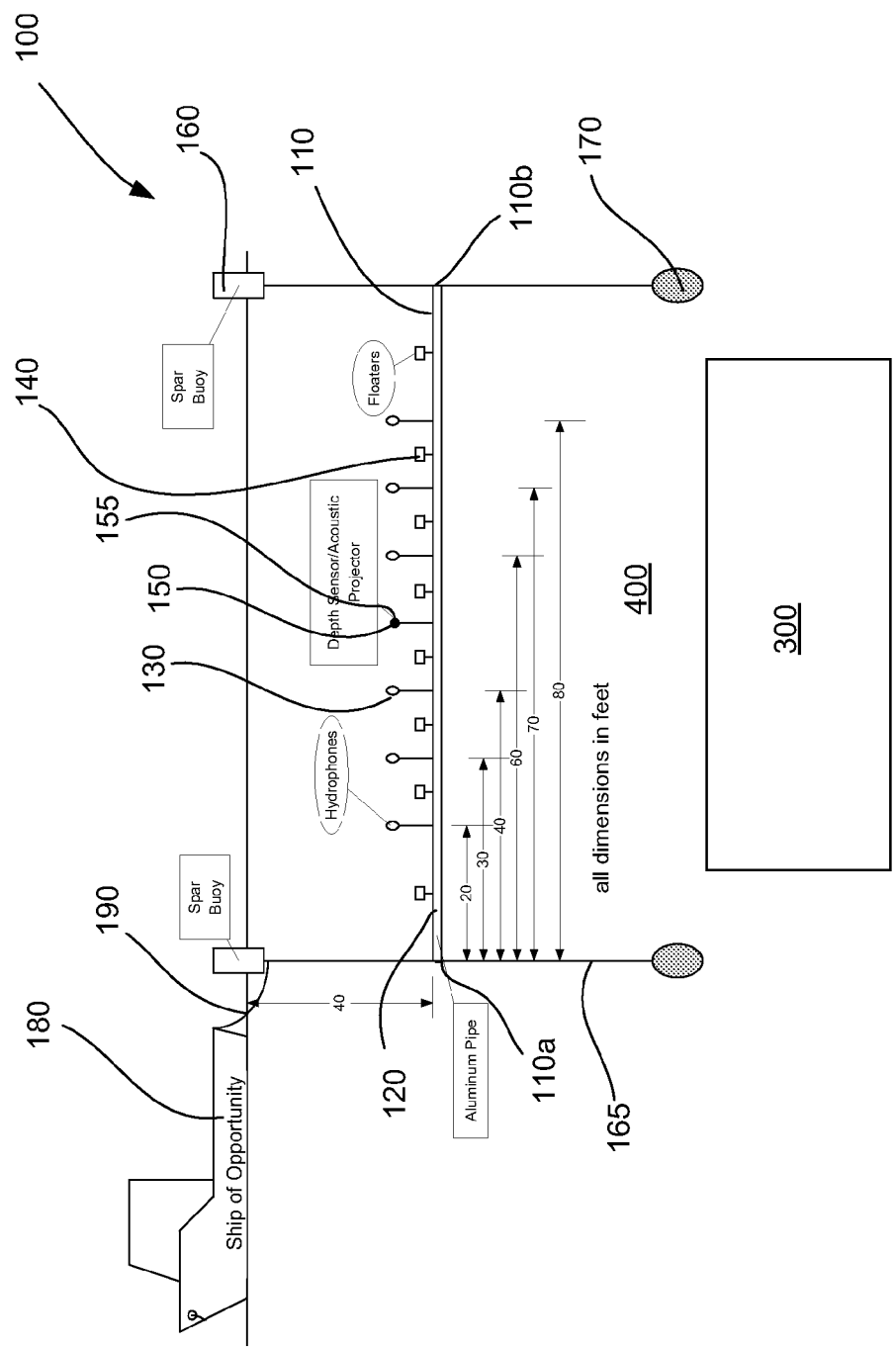
FIG. 1A illustrates a schematic diagram of a system for measuring acoustic signature of an object, according to an embodiment of the invention.
Figure 1B:
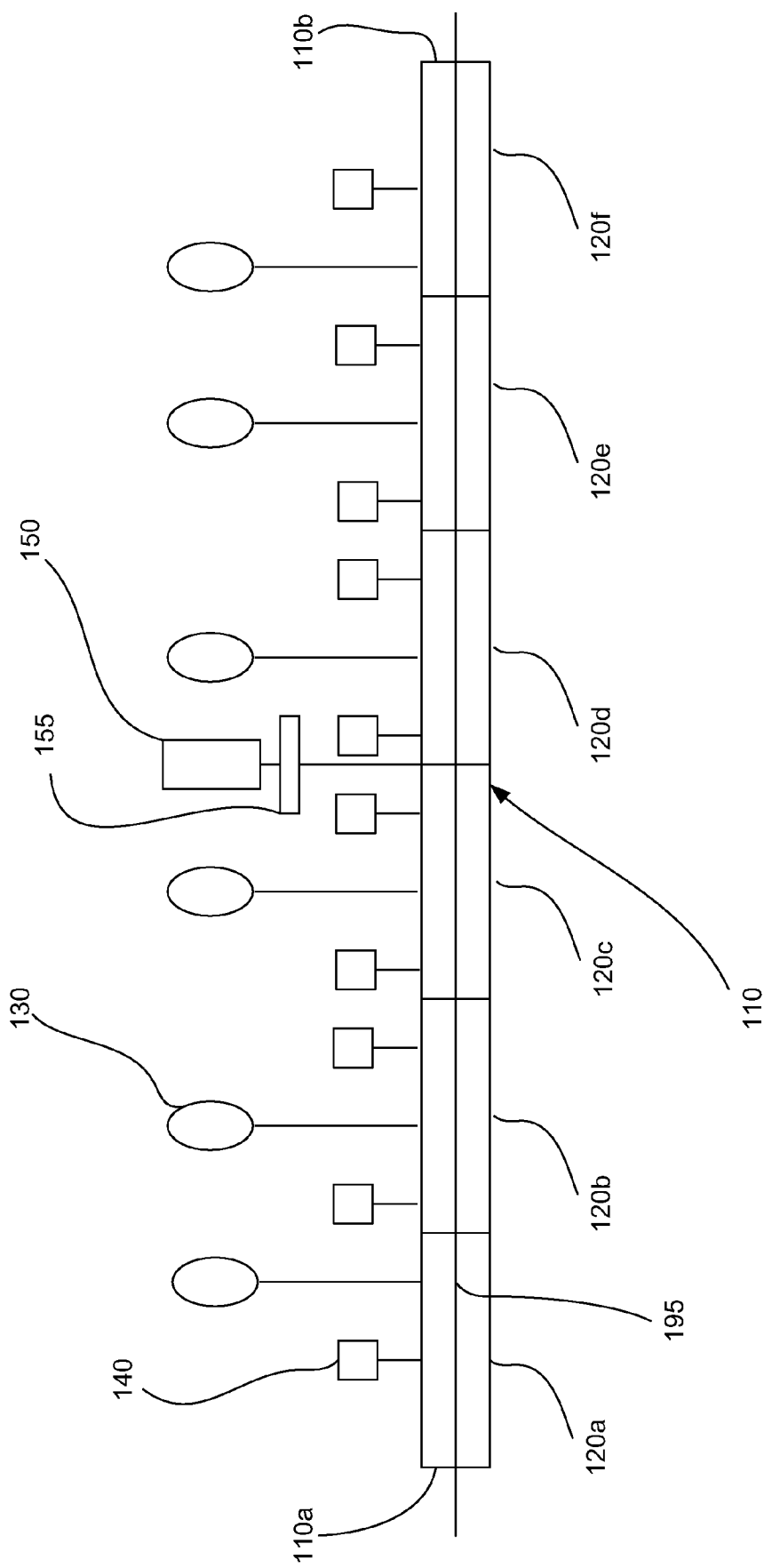
FIG. 1B illustrates a schematic diagram of the longitudinal member of the system of FIG. 1A.

FIGS. 1A and 1B depict a system 100 for measuring the acoustic signature of an object 300 in fluid 400 (e.g. seawater) according to an exemplary embodiment of the present invention. System 100 may be deployed from a surface vessel such as surface ship 180. As illustrated in FIG. 1B, system 100 includes a longitudinal member 110 comprising a plurality of interconnected rigid segments (120a, 120b, 120c, . . . 120n), each segment detachably coupled to a corresponding another segment so as to form the longitudinal member 110 having a proximal end 110a and a distal end 110b. In an exemplary embodiment, rigid segments (120a, 120b, . . . 120f) may be pipe segments. For sake of simplicity, terms "rigid segments" and "pipe segments" may be used interchangeably. The intermediate pipe segments (120b, 120c, 120d, and 120e) include multiple hydrophones 130 mounted thereon at known locations. The location and number of hydrophones are selected based upon requirements, such as the total length of longitudinal member 110 and the number of pipe segments (120n) forming longitudinal member 110 to provide a sufficiently wide separation distance between two end buoys 160 for safe traverse of target object 300 over hydrophones 130, the navigation accuracy of target object 300 to pass over hydrophones 130, and the requirement to measure the directivity as well as amplitude and frequency of the acoustic signature of target object 300. In an exemplary embodiment, each intermediate pipe segment (120b, 120c, 120d, and 120e) includes at least two floats 140. In an exemplary embodiment of the invention, system 100 includes six pipe segments (120a, 120b, . . . 120f), six hydrophones 130 and ten floats 140 and may be about one hundred twenty (120) feet long, with each pipe segment (120a, 120b, . . . 120f) measuring about twenty (20) feet. Different numbers of pipe segments, hydrophones and floats may be used depending upon the requirements as described above. In an exemplary embodiment, a polypropelene line 195 may be used to string pipe segments 120a, 120b, . . . 120f together by passing line 195 through the hollow of pipe segments 120a, 120b, . . . 120f. Line 195 also serves as a safety feature to keep pipe segments 120n together in the event that joints 710 between pipe segments 120n break. Lines of other materials may also be used so long as the lines are strong enough to hold pipe segments 120a, 120b, . . . 120f together in case the pipe segments 120a, 120b, . . . 120f are disconnected.

An acoustic projector (150) is coupled to a central pipe segment (120c, 120d) of longitudinal member 110 for providing an acoustic calibration signal for the other hydrophones for in-situ calibration of the layout. Furthermore, a pressure/depth sensor (155) is also coupled to central pipe segment (120c, 120d) of longitudinal member 110 for providing depth information of the hydrophones 130 and longitudinal member 120. The resulting acoustic signature signals from the target object 300 submerged in or on the surface of the water 400 are received via hydrophones 130 spaced apart from one another at predetermined distances. The received acoustic signals information from the target object 300 are observed on the surface ship 180 in real time and processed for determining the acoustic signature—amplitude, frequency and directivity—associated with target object 300, as described in detail below.

In one configuration, as seen in FIG. 1A, system 100 is suspended by two spar buoys 160 and two clump weights 170 suspended from spar buoys 160 via two tethers 165. Floats 140 are coupled to the plurality of pipe-segments 120a, 120b, . . . 120f. The combination of floats 140, spar buoys 160 and clump weights 170 render longitudinal member 110 neutrally buoyant. As is understood in the art, an object is neutrally buoyant when the object neither sinks nor rises, but remains at a constant depth. In other words, when an object displaces water of weight equal to the weight of the object, the object is in a state of neutral buoyancy. A cable 190 transfers measured signals from hydrophones 130 and pressure/depth sensor 155 to ship 180. Cable 190 runs from hydrophones 130 either through the hollow of (not shown) or outside of the pipe segments 120, kept in place by tiewraps, along the tethers to the spar buoy 160 to surface vessel 180. Frequency and amplitude of signals from system 100 are processed and may cover frequency span over four decades, such as from 10 Hertz (Hz) to 100 Hz, 100 Hz to 1000 Hz, 1000 Hz to 10000 Hz, and 10000 Hz to 100000 Hz. The selection of frequency may be selected based on requirements such as the design acoustic signature—amplitude and frequency—specifications of a target object for the target object not to be detected given a set of ocean environmental conditions with known ambient noise spectrum, to meet a certain acoustic signature specified amplitude and frequency limits, the requirement for the target object not to trigger devices which are listening for the target object at specific frequencies or frequency regimes and, if triggered, the devices may harm the target object. Cable 190 may be coupled to tether 165.

In an exemplary embodiment, acoustic projector 150 may be a piezoceramic projector. However, as is understood by one of ordinary skill in the arts other acoustic projectors, such as moving coil, Terfenol, and other underwater acoustic projectors, for example, may be utilized and are contemplated within the scope of the present invention.

In an exemplary embodiment, a depth sensor 155 is coupled to longitudinal member 110, along with acoustic projector 150. Depth sensor 155 measures and monitors the depth of system 100 when deployed in water. An example of a depth sensor suitable for system 100 is water level sensor model number WL16U-120 available from Global Water Instrumentation Inc., 11390 Amalgam Way, Gold River, Calif., 95670, USA.

Figure 2:
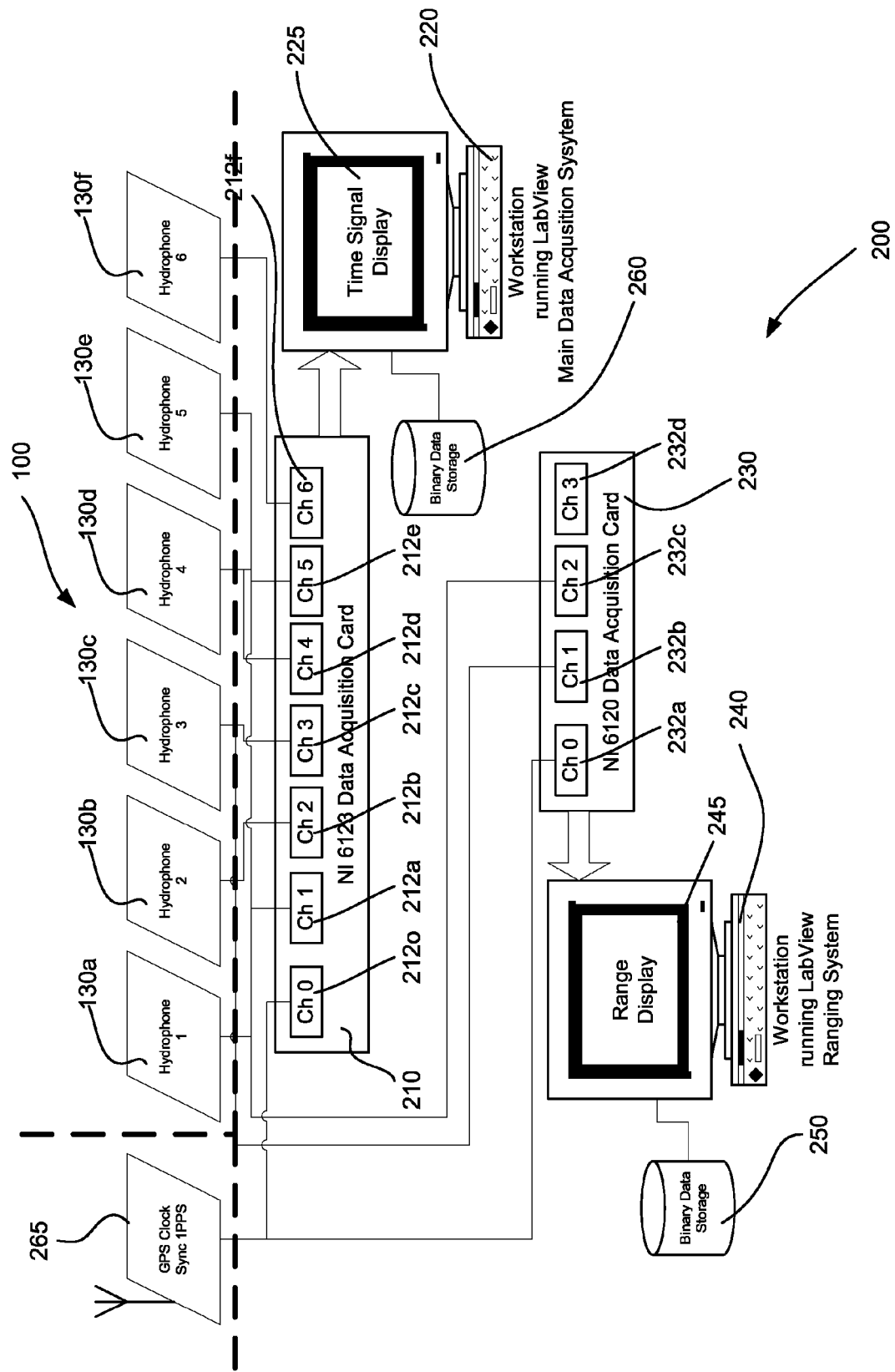
FIG. 2 illustrates an exemplary schematic diagram of a data acquisition system used by the system of FIGS. 1A and 1B, as per an embodiment of the invention.

Referring now to FIG. 2, an exemplary data acquisition system 200 is illustrated. Data acquisition system 200 may be located on surface vessel 180. An exemplary data acquisition system 200 includes two data acquisition cards 210, 230, which are in electronic communications with two work stations 220, 240. For system 100 with six hydrophones (130a, 130b, . . . 130f), data acquisition card 210 has eight (8) channels (212a, 212b, 212c, . . . 212f) of simultaneous analog inputs and data acquisition card 230 has four (4) channels (232a, 232b, 232c, 232d) of simultaneous analog inputs. Each data acquisition card 210, 230 receives at inputs 212o, 232a a GPS clock signal from a GPS receiver 265. Such cards may be obtained from National Instruments, Austin, Tex., sold as model numbers NI PCI-6123 and NI PCI-6120 respectively. Workstations 220, 240 employ data acquisition software applications to receive and manage signals from data acquisition cards 210, 230 and synchronize the received signals with 1 pulse per second (PPS) signals from the GPS clock received by receiver 265. These software applications may be developed using LabView® software, available commercially from National Instruments, Austin, Tex. Workstation 220 is used for digitizing and displaying the analogue signals from the hydrophones and the GPS 1PPS signal, storing the digitized data to disk and processing the data to calculate and determine the amplitude and frequency of the acoustic signature of target object 300 and for determining the range of target object 300. In one configuration of the present invention, the range of the data acquisition cards 210 and 230, the sampling rate, the time for beginning and ending of data acquisition and the location where data is stored can be controlled by software applications configured using LabVIEW®. Workstation 240 receives the signals from the two hydrophones located in the center of the submerged longitudinal member 100 and the GPS 1 PPS and is used for digitizing the analogue signals and calculating and determining the range to target object 300 and the relative position of target object 300 relative to the location of the submerged hydrophones 130a, 130b, . . . 130f. Target object 300 transmits a pinger signal triggered by the GPS 1PPS, and the time delay as measured by data acquisition system 200 between the GPS 1PPS and time that the pinger signal is received will give a measure of the range and bearing of target object 300 when this time is multiplied by the speed of sound in the water. The speed of sound in the water is separately measured using a sound velocity profiler (SVP) such as SVP-20, available from Reson A/S, Fabriksvangen 13, 3550 Slangerup, Denmark. In an exemplary embodiment, the received signals are acquired over a period of about one and one half minutes. The period of acquisition may be limited by background noise and may be varied according to the ambient conditions.

Acoustic signals radiated by target object 300 are received by hydrophones 130a, 130b, . . . 130f which are then electronically communicated to data acquisition cards 210, 230 and then further communicated to workstations 220, 240 for signal processing. Signal processing means includes workstations 220, 240 which process signals received by hydrophones 130 to determine acoustic signature amplitude and frequency of target object 300. In an exemplary embodiment, workstation 220 includes a display unit 225 which displays the measured acoustic signature of target object 300 in real time. In an exemplary embodiment, workstation 240 includes a display unit 245 which displays the range and relative location of target object 300 in real time. Such data acquisition cards and workstations are known in the art and therefore are not described in detail for the sake of brevity. Measured acoustic signals may be stored in data storages 250, 260 for post mission analysis and further post processing which may be done at a later time. Post processing may be accomplished using applications developed in LabVIEW® or other commercially available software such as MatLab®.

Figure 3:
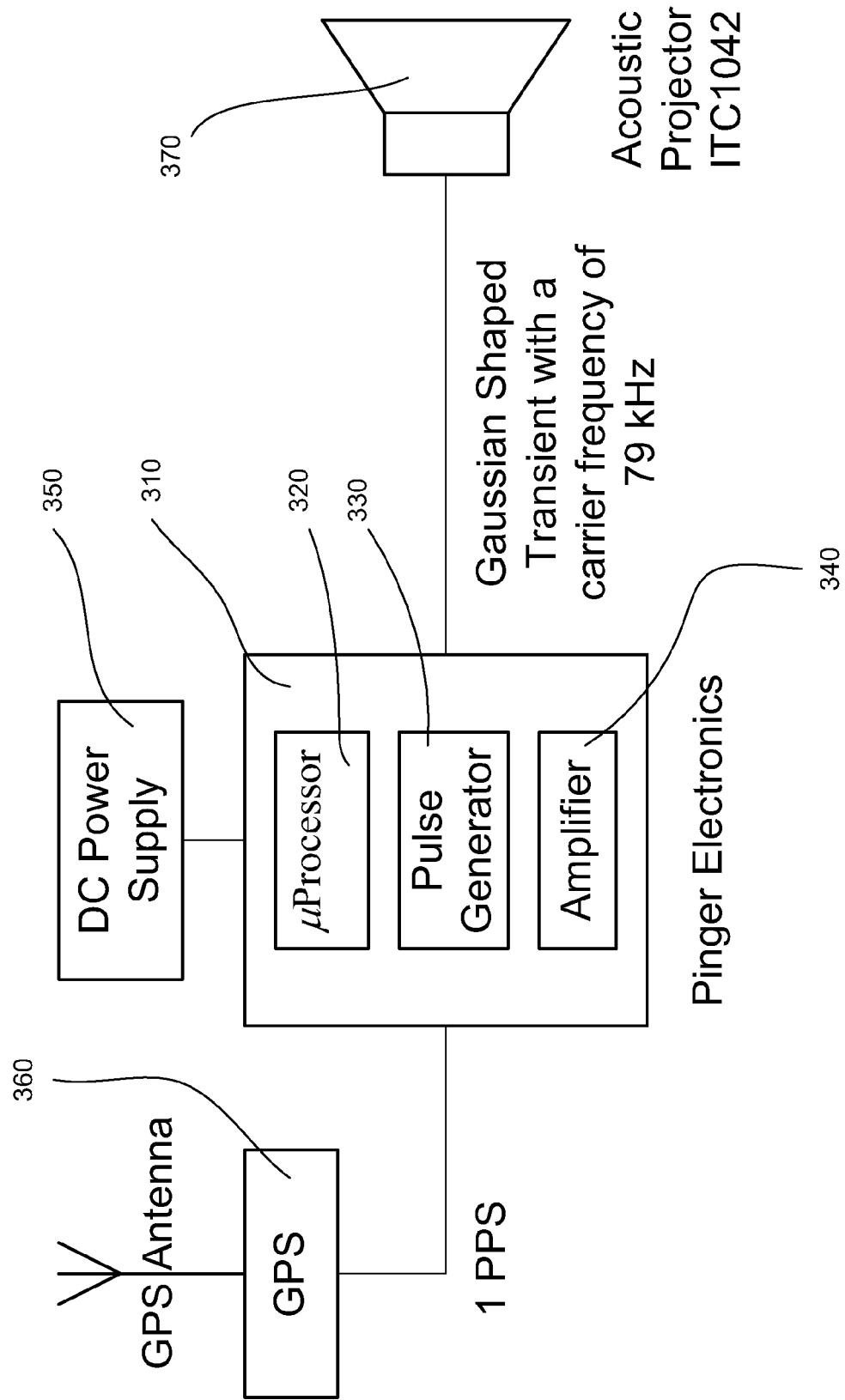
FIG. 3 shows a high frequency acoustic transmitter (pinger) that is mounted on the target object and synchronized with a GPS clock, according to an embodiment of the invention.

Now referring to FIG. 3, a schematic diagram of a high frequency acoustic transmitter or pinger 310 is illustrated. In an exemplary embodiment, high frequency pinger 310 operates at 79 kHz but this may be modified depending on system requirements, in particular, those pertaining to the frequency range of interest of the acoustic signature of target object 300. Pinger 310 includes a power supply 350, a microprocessor 320, a pulse generator 330, an amplifier 340, a GPS antenna and receiver 360, and an acoustic projector 370. Acoustic projector 370 may be piezoelectric or other known type of acoustic projector. Pinger 310 may be co-located with target object 300 whose acoustic signature is to be measured to determine the range of target object 300 from the acoustic hydrophones 130a, 130b, . . . 130f. In operation, pinger 310 functions as follows: In an exemplary embodiment, pinger 310 receives a trigger signal every one second from the GPS 1PPS clock via GPS antenna and receiver 360, and upon receipt of the trigger a gaussian shaped signal transient burst at a given frequency (e.g. 79 kHz) is generated. The duration of the transient burst is preferably only a few milliseconds (e.g. 2-4 ms) and the shape of the transient burst may be modified according to requirements. The 79 kHz gaussian shaped transient burst signal is supplied to acoustic pinger 310 through amplifier 340. As pinger 310 is triggered using the GPS 1PPS signal and the same GPS 1PPS signal is recorded in the data acquisition systems 220 and 240, via GPS receiver and antenna 265, target object pinger 310 and the hydrophones 130a, 130b, . . . 130f are synchronized. In the described embodiment, the invention thus uses universally available GPS 1 PPS clock signal to synchronize signals transmitted from pinger 310 and received by hydrophones 130a, 130b, . . . 130f, thereby eliminating the need for other synchronizing electronics.

Figure 4:
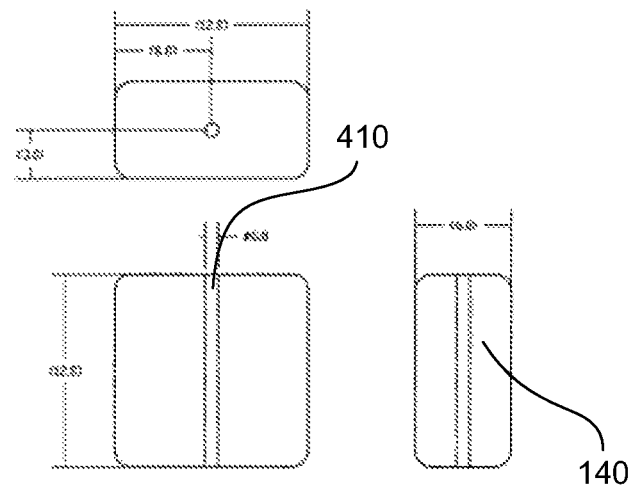
FIG. 4 illustrates an exemplary float used in the system of FIGS. 1A and 1B, according to an embodiment of the invention.

Referring now to FIG. 4, an exemplary embodiment of float 140 is shown. When longitudinal member 110 is suspended in water, floats 140, in conjunction with spar buoys 160 (of FIG. 1A) and clump weights 170 (of FIG. 1A), render member 110 neutrally buoyant. Float 140 may be made of foam or other material which is capable of imparting the required buoyancy to compensate for the weight of the longitudinal member 110. Floats 140 have a through aperture 410 to facilitate connection to longitudinal member 110. Typical material for the float member is syntactic foam.

Figure 5:
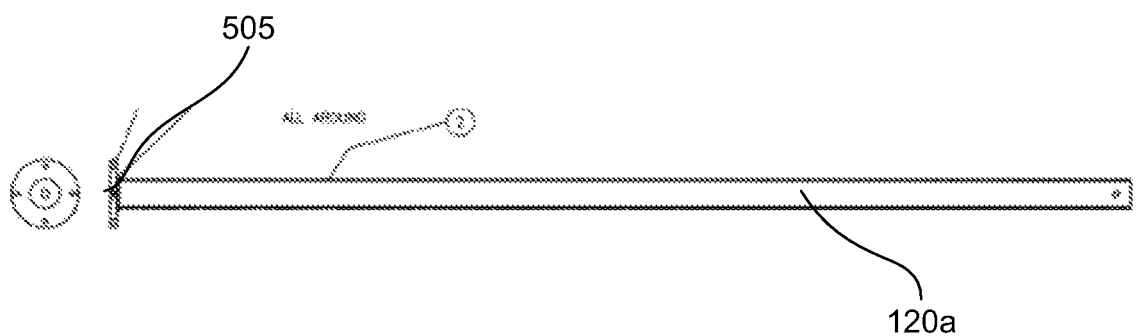
FIG. 5 shows an exemplary end pipe segment used in the system of FIGS. 1A and 1B, according to an embodiment of the invention.

Referring now to FIG. 5, an exemplary embodiment of a pipe segment 120a is illustrated. As is understood in the art, pipe segment 120a is hollow having internal space defined by the pipe walls. Pipe segment 120a may be an aluminum pipe. Other known materials may also be used for pipe segment 120a, such as PVC, or plastic. Material used for pipe segment 120a should be sufficiently rigid to support the weight of floats 140, hydrophones 130 and acoustic source 150 and should be easily handled during deployment. In an exemplary embodiment, pipe segment 120a has a circular cross-section.

Pipe segment 120a may also have other cross-sectional shapes, such as polygonal and oval or square. Illustrated pipe segment 120a depicts a pipe segment at proximal end 110a of longitudinal member 110 having a flanged end 505 to facilitate connection to the lines to spar buoy 160 and to clump weight 170. Another pipe segment 120f at the distal end 110b of longitudinal member 110 has a corresponding flanged end (not shown).

Figure 6:
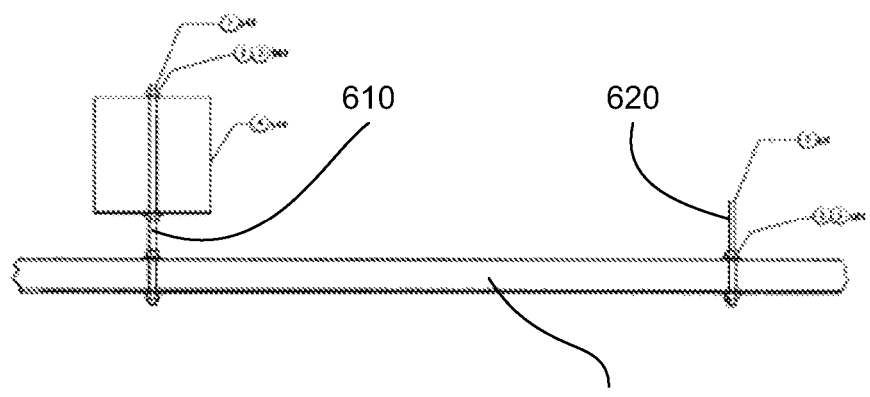
FIG. 6 illustrates an exemplary joint for connecting floats and hydrophones to the system of FIGS. 1A and 1B, according to an embodiment of the invention.

FIG. 6 illustrates an exemplary mechanism for connecting floats 140 and hydrophones 130 to a pipe segment 120. Rods 610, 620 are fastened to pipe-segment 120 in a vertical orientation using, for example, nuts and bolts. Rods 610, 620 may be made of fiber glass or other suitable materials, for example, aluminum, plastic, PVC, DELRIN®, polytetrafluoroehtyelene (PFTE), polytetrafluoroethene (PFTE), etc. Floats 140 are removably fastened to rods 610, accommodated by apertures 410 (of FIG. 4), By way of examples only, fasteners such as washers and nuts may be employed to fasten floats 140 to rods 610, 620. Hydrophones 130 (not shown in FIG. 6) are fastened to rods 620 through the use of tiewraps. Once hydrophones 130 and floats 140 are fastened to rods 620, 610 respectively, hydrophones 130 and floats 140 maintain their position and orientation with respect to pipe segment 120, when suspended in water. The floats on the rods create a positive righting moment on the longitudinal segment to maintain the hydrophones upright through the water.

Figure 7:
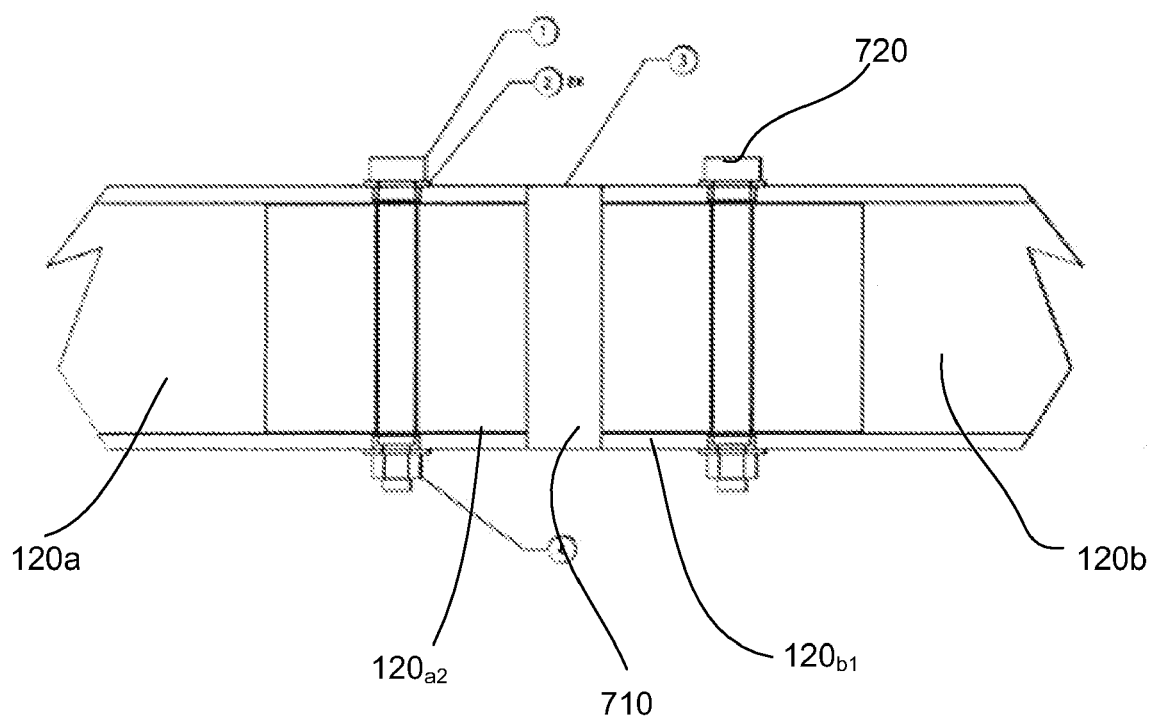
FIG. 7 illustrates an exemplary joint for connecting two pipe-segments, according to an embodiment of the invention.

FIG. 7 illustrates an exemplary insert 710 for connecting two pipe segments 120. Insert 710 is inserted into corresponding ends $120_{a2}$, $120_{b1}$ of two pipe-segments 120a, 120b. Fasteners 720 connect pipe-segments 120 to insert 710. In an exemplary embodiment, insert 710 is made of plastic. Other materials may also be used, for example, PVC, DELRIN® and polytetrafluoroethyelene and polytetrafluoroethene (PFTE). Inserts 710 are designed to provide sufficient rigidity at the connection between the pipe segments 120a, 120b, . . . 120f to maintain longitudinal member 110 horizontal when in the water. Furthermore, inserts 710 also provide sufficient flexibility that the pipe segments 120a, 120b, . . . 120f can move and bend relative to each other when on deck of surface ship 180 to facilitate deployment and eliminate the need to have a surface ship which is as long or longer than the total length of longitudinal member 110. With inserts 710 when longitudinal member 110 is out of the water it has sufficient flexibility to allow bending at joints without breaking. Insert 710 has a central through hole for the line 195 (not shown) to pass through.

Now will be described a method of assembling and deploying a system for measuring acoustic signature of objects in water. Spar buoy 160 and clump weight 170 are deployed first. End pipe segment 120f is connected to surface spar buoy 160 and clump weight 170 using line through flange section 505, avoiding the use of metal cleats which may influence the acoustic signature measurements. End pipe section 110f is connected to pipe segment 120e using inserts 710 and fasteners 720. Intermediate pipe segments 120d, 120c, and 120b, are connected to each other using inserts 710 and fasteners 720 sequentially. End pipe segment 120a is then connected to pipe segment 120b using insert 710 and fasteners 720. Line 195 is threaded through pipe segments 120a, 120b, . . . 120f to keep them together and to act a safety feature if pipe segments 120a, 120b, . . . 120f of longitudinal member 110 were to come apart. Floats 130, hydrophones 140 and an acoustic source 150 and depth/pressure sensor 155 are connected to remaining pipe segments (120b, 120c, . . . 120f). Cables from hydrophones 140, acoustic projector 150 and depth/pressure sensor 155 are either threaded inside pipe segments 120a, 120b, . . . 120f or attached with tie wraps to the outside of longitudinal member 110. Pipe segments (120b, 120c, . . . 120f) are connected together using inserts 710 and fasteners 720 to form longitudinal member 110, as each subsequent pipe segment and insert is added line 195 is strung through each component and finally connected to end pipe segment 120a. Remaining spar buoy 160 and clump weight 170 are finally connected to end pipe segment 120a in a similar way as for the first pipe segment 120f.

Member 110 is slid down the stern of vessel 180 into water 400 as more pipe segments are being connected. Member 110 is suspended in water using two spar buoys 160 and two weights 170 at a predetermined depth. For example, longitudinal member 110 may be deployed at a nominal depth of about forty (40) feet. The depth of member 100 is adjustable based on requirements by adjusting the length of line 165 between spar buoys 160 and clump weights 170 and end pipe segments 120a, 120f. The longer the length of line 165 between spar buoy 160 and pipe segment 120a, 120f the deeper will be longitudinal member 110 in water 400. Pressure/depth sensor 155 is used to measure the depth at which longitudinal member 110 is deployed. Acoustic source 150 is used to calibrate hydrophones 130 in-situ. Thus, system 100 is a self calibrating system. Cables 190 from hydrophones 130 are connected to data acquisition cards 210 and 230 and further to workstations 220 and 240, which may be on ship 180. More than two data acquisition cards as well as more than two workstations may also be used, if so desired. Acoustic measurements from hydrophones can thus be monitored in real-time. Target object 300 generally moves along a track in a direction generally transverse to longitudinal member 110.

Figure 8:
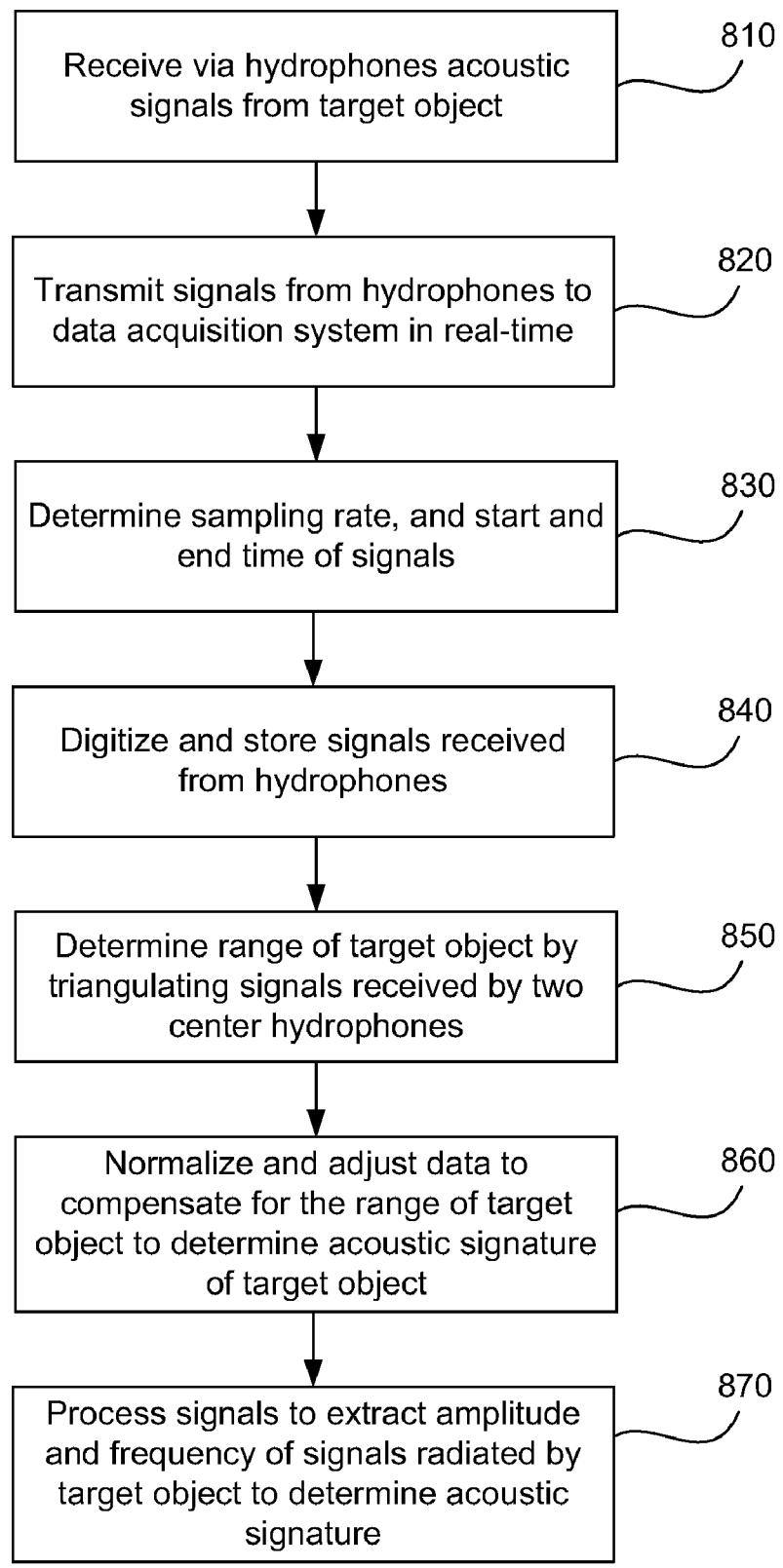
FIG. 8 illustrates a flow chart for an exemplary method of measuring acoustic signature and determining the range of the target object as per an aspect of the invention.

Referring now to FIG. 8, an exemplary method for determining the acoustic signature and the range of target object 300 is described. Pinger 310 is synchronized with GPS 1 PPS clock and is installed on a target object 300 for range monitoring. Similarly, the data acquisition system 200 on ship 180 is also synchronized with GPS clock 1 PPS signals. At 810, acoustic signals radiated by target object 300 are received by hydrophones 130. Signals received by hydrophones 130 are transmitted in real-time to data acquisition system 200 on ship 180 via cables 190, at 820. The sampling rate and the start and the end time of the signals is determined by data acquisition system 200, at 830. Since high frequency pinger 370 and data acquisition system 200 are synchronized to GPS clock, and since pinger 370 transmits acoustic signals at predetermined time, the system determines the time taken by acoustic signals to travel from target object 300 to hydrophones 130 to calculate the range of target object 300. At 840, the signals are digitized, processed and stored using software applications configured, for example, in LabVIEW®. Known ranging algorithms may be employed to determine the range of target object 300 from the signals received by hydrophones as understood by one skilled in the art. In one embodiment, signals received by center hydrophones 130c, 130d are triangulated to determine the range and bearing of target object 300. At 860, data signals are normalized, and are adjusted to compensate for the range information. Data signals are then processed to determine the amplitude and the frequency of acoustic signals radiated by target object 300 to determine the acoustic signature of target object 300, at 870.

An embodiment of the invention includes a kit for measuring acoustic signature of a target object in water. Such a kit includes a plurality of pipe segments and a plurality of inserts. The plurality of inserts are adapted to detachably connect at least two of the plurality of pipe segments with each other while allowing the two connected pipe segments to bend at the joint relative to each other. The kit further includes a plurality of hydrophones which are adapted to be connected to the plurality of pipe segments and a plurality of floats which are also adapted to be connected to the plurality of pipe segments. The kit includes an acoustic projector which is configured to calibrate the plurality of hydrophones and a depth/pressure sensor. The kit further includes a line which may be strung through the plurality of pipe segments, keeping them together in case an insert fails to keep any two of the pipe segments connected. A plurality of cables is also included which are adapted to connect to the plurality of hydrophones and to communicate with a data acquisition system. The kit also includes at least two buoys and two weights which may be attached to the plurality of pipe segments. The two buoys and the two weights, in conjunction with the plurality of floats, render the plurality of pipe segments neutrally buoyant when the assembled kit is suspended in water.

It will be apparent to those skilled in the art that modifications and variations may be made in the system of the present invention without departing from the spirit or scope of the invention. It is intended that the present invention cover the modification and variations of this invention provided they come within the scope of the appended claims and their equivalents.

What is claimed is:

1. An assembly for measuring acoustic signature of a target object in water, said assembly comprising:
    an elongated, longitudinal member comprising a plurality of rigid segments detachably connected to each other;
    a plurality of floats connected to said longitudinal member via a plurality of rods, said plurality of floats rendering said longitudinal member neutrally buoyant when said longitudinal member is suspended in water at a predetermined depth;
    an acoustic projector of a known source level, said projector adapted to emit acoustic signals for self calibration of the system;
    a plurality of hydrophones connected to said longitudinal member, said plurality of hydrophones being spaced apart at a predetermined distance from one another, said plurality of hydrophones configured to receive acoustic signals radiated by the target object; and
    a plurality of cables connected to said plurality of hydrophones, said plurality of cables adapted to communicate with a data acquisition system.

2. The assembly of claim 1, wherein said plurality of rigid segments comprises a plurality of pipe segments.

3. The assembly of claim 1, wherein said plurality of rigid segments are made from aluminum.

4. The assembly of claim 2, further comprising a line, said line being strung through said plurality of pipe segments.

5. An assembly for measuring acoustic signature of a target object in water, said assembly comprising:
    a plurality of rigid segments detachably connected to each other to form a longitudinal member;
    a plurality of floats connected to said longitudinal member, said plurality of floats rendering said longitudinal member neutrally buoyant when said longitudinal member is suspended in water at a predetermined depth;
    an acoustic projector of a known source level, said projector adapted to emit acoustic signals for self calibration of the system;
    a plurality of hydrophones connected to said longitudinal member, said plurality of hydrophones being spaced apart at a predetermined distance from one another, said plurality of hydrophones configured to receive acoustic signals radiated by the target object;
    a plurality of cables connected to said plurality of hydrophones, said plurality of cables adapted to communicate with a data acquisition system;
    first and second buoys connected at first and second ends of said longitudinal member; and
    first and second weights suspended from said first and second buoys.

6. An assembly for measuring acoustic signature of a target object in water, said assembly comprising:
    a plurality of rigid segments detachably connected to each other to form a longitudinal member;
    a plurality of floats connected to said longitudinal member, said plurality of floats rendering said longitudinal member neutrally buoyant when said longitudinal member is suspended in water at a predetermined depth;
    an acoustic projector of a known source level, said projector adapted to emit acoustic signals for self calibration of the system;
    a plurality of hydrophones connected to said longitudinal member, said plurality of hydrophones being spaced apart at a predetermined distance from one another, said plurality of hydrophones configured to receive acoustic signals radiated by the target object;
    a plurality of cables connected to said plurality of hydrophones, said plurality of cables adapted to communicate with a data acquisition system;
    wherein said plurality of rigid segments are detachably connected to one another by a plurality of inserts, said inserts being sufficiently flexible to allow said plurality of rigid segments to bend relative to one another.

7. The assembly of claim 6, wherein said plurality of inserts are made from a material selected from the group consisting of plastic, PVC, polytetrafluoroethene, and polytetrafluoroethylene.

8. A system for measuring acoustic signature of a target object in water, said system comprising:
    an assembly comprising:
        a plurality of rigid segments detachably connected to each other to form a longitudinal member;
        a plurality of floats connected to said longitudinal member, said plurality of floats rendering said longitudinal member neutrally buoyant when said longitudinal member is suspended in water at a predetermined depth;
        an acoustic projector of a known source level, said projector adapted to emit acoustic signals for self calibration of the system;
        a plurality of hydrophones connected to said longitudinal member, said plurality of hydrophones being spaced apart at a predetermined distance from one another, said plurality of hydrophones configured to receive acoustic signals radiated by the target object; and
        a plurality of cables connected to said plurality of hydrophones, said plurality of cables adapted to communicate with a data acquisition system;
    a data acquisition system located on a ship, said data acquisition system comprising:
        an antenna, said antenna configured to receive GPS clock signals;
        a data acquisition card in communication with said plurality of hydrophones and said GPS clock signals; and
        a computer in communication with said data acquisition card, said computer programmed to receive and process electronic signals received by said data acquisition card; and
        a high frequency pinger configured to radiate acoustic signals, said pinger located on the target object, said pinger in communication with a GPS receiver and antenna, said GPS receiver and antenna configured to receive GPS clock signals.

9. The system of claim 8, wherein said assembly further comprises a depth sensor.

10. The system of claim 8, wherein said assembly further comprises:
   first and second buoys connected at first and second ends of said longitudinal member; and
   first and second weights suspended from said first and second buoys.

11. The system of claim 8, wherein said high frequency pinger on the target object and said data acquisition system on the ship are synchronized using GPS clock signals.

12. The system of claim 8, wherein said signals received by said plurality of hydrophones are transmitted to said data acquisition system in real-time.

13. The system of claim 8, further comprising a display unit, said display unit in electrical communication with said computer, wherein said display unit is adapted to display acoustic signature of the target object in real-time.

14. The system of claim 8, further comprising a display unit, said display unit in electrical communication with said computer, wherein said display unit is adapted to display range of the target object in real-time.

15. A kit for measuring acoustic signature of a target object in water, said kit comprising:
   a plurality of pipe segments;
   a plurality of inserts, said plurality of inserts adapted to connect at least two of said plurality of pipe segments with each other and to allow said connected pipe segments to bend relative to each other;
   a plurality of hydrophones, said plurality of hydrophones adapted to be connected to said plurality of pipe segments;
   a plurality of floats, said plurality of floats adapted to be connected to said plurality of pipe segments;
   an acoustic projector, said projector configured to calibrate said plurality of hydrophones;
   a depth/pressure sensor;
   a line adapted to keep said plurality of pipe segments together;
   a plurality of cables, said cables adapted to connect to said plurality of hydrophones and to communicate with a data acquisition system;
   at least two spar buoys; and
   at least two weights,
   wherein said at least two spar buoys and at least two weights, in conjunction with said floats render said plurality of pipe segments neutrally buoyant, when said plurality of pipe segments are suspended in water at a predetermined depth.

16. A neutrally buoyant hydrophone array apparatus comprising:
   a neutrally buoyant elongated, longitudinal member comprising a plurality of rigid segments detachably connected to each other;
   a plurality of hydrophones coupled to said longitudinal member via a plurality of rods, said plurality of hydrophones being electrically coupled to a data acquisition system; and
   an acoustic projector coupled to said longitudinal member, said projector configured to emit acoustic signals to calibrate said plurality of hydrophones,
   wherein each of said plurality of rods comprises a first end coupled to one of said plurality of rigid segments and a second end coupled to one of said plurality of hydrophones, each of said plurality of rods extending radially outward from a corresponding one of said plurality of rigid segments.

17. A neutrally buoyant hydrophone array apparatus comprising:
   a neutrally buoyant elongated, longitudinal member comprising a plurality of rigid segments detachably connected to each other;
   a plurality of hydrophones coupled to said longitudinal member, said plurality of hydrophones being electrically coupled to a data acquisition system; and
   an acoustic projector coupled to said longitudinal member, said projector configured to emit acoustic signals to calibrate said plurality of hydrophones,
   wherein said longitudinal member is bendable at joints between adjacent rigid segments of said plurality of rigid segments.

18. A neutrally buoyant hydrophone array apparatus comprising:
   a neutrally buoyant elongated, longitudinal member comprising a plurality of rigid segments detachably connected to each other;
   a plurality of hydrophones coupled to said longitudinal member, said plurality of hydrophones being electrically coupled to a data acquisition system;
   an acoustic projector coupled to said longitudinal member, said projector configured to emit acoustic signals to calibrate said plurality of hydrophones; and
   a flexible insert configured to detachably connect first and second adjacent rigid segments of said plurality of rigid segments.

19. A neutrally buoyant hydrophone array apparatus comprising:
   a neutrally buoyant elongated, longitudinal member comprising a plurality of rigid segments detachably connected to each other;
   a plurality of hydrophones coupled to said longitudinal member, said plurality of hydrophones being electrically coupled to a data acquisition system;
   an acoustic projector coupled to said longitudinal member, said projector configured to emit acoustic signals to calibrate said plurality of hydrophones;
   first and second buoys connected at first and second ends of said longitudinal member; and
   first and second weights suspended from said first and second buoys.

20. The apparatus of claim 19, further comprising a depth sensor.

21. The apparatus of claim 18, wherein said flexible insert is made from a material selected from the group consisting of plastic, PVC, polytetrafluoroethene, and polytetrafluoroethylene.

22. The apparatus of claim 18, wherein signals received by said plurality of hydrophones are transmitted to a data acquisition system in real-time.

* * * * *